US012801203B2

(12) United States Patent
Nemani et al.

(10) Patent No.: US 12,801,203 B2
(45) Date of Patent: Nov. 17, 2026

(54) PERFORMING DYNAMIC MICROARCHITECTURAL THROTTLING OF PROCESSOR CORES BASED ON QUALITY-OF-SERVICE (QoS) LEVELS IN PROCESSOR DEVICES

(71) Applicant: QUALCOMM Incorporated, San Diego, CA (US)

(72) Inventors: Mahadevamurty Nemani, San Diego, CA (US); Sneha Wani, Bellevue, WA (US); Mohd Imran Beg, Whitby (CA); Nitin Makhija, San Jose, CA (US); Arun Sukheja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/469,630

(22) Filed: Sep. 19, 2023

(65) Prior Publication Data

US 2025/0094182 A1 Mar. 20, 2025

(51) Int. Cl.
*G06F 1/324* (2019.01)
*G06F 1/3234* (2019.01)
(Continued)

(52) U.S. Cl.
CPC ............ *G06F 1/324* (2013.01); *G06F 1/3243* (2013.01); *G06F 1/3296* (2013.01); *G06F 9/448* (2018.02)

(58) Field of Classification Search
CPC ............................... G06F 9/448; G06F 713/10
See application file for complete search history.

(56) References Cited

U.S. PATENT DOCUMENTS 6,564,328 B1 * 5/2003 Grochowski ......... G06F 9/3869 713/320
11,442,529 B2 * 9/2022 Ananthakrishnan ......................... G06F 11/349
(Continued)

FOREIGN PATENT DOCUMENTS

WO 2018085097 A1 5/2018
WO 2021242389 A1 12/2021

OTHER PUBLICATIONS

International Search Report and Written Opinion for International Patent Application No. PCT/US2024/042113, mailed Nov. 19, 2024, 15 pages.
(Continued)

*Primary Examiner* — Jaweed A Abbaszadeh
*Assistant Examiner* — Cheri L Harrington
(74) *Attorney, Agent, or Firm* — W&T

(57) ABSTRACT

Performing dynamic microarchitectural throttling of processor cores based on Quality-of-Service (QOS) levels in processor devices is disclosed herein. In some aspects, a processor device comprises a synchronous core cluster including a plurality of processor cores, a throttling selection circuit, and a throttling circuit. The throttling selection circuit receives a QoS level associated with a workload scheduled for execution by a processor core. The throttling selection circuit determines a performance state of the processor core, and determines a throttling level for the processor core, based on the QoS level and the performance state. The throttling selection circuit provides the throttling level to the throttling circuit, which performs microarchitectural throttling of the processor core based on the throttling level.

29 Claims, 9 Drawing Sheets

(51) Int. Cl.
*G06F 1/3296* (2019.01)
*G06F 9/448* (2018.01)

(56) References Cited

U.S. PATENT DOCUMENTS

| | | | | |
|---|---|---|---|---|
| 11,694,940 | B1 * | 7/2023 | Mathuriya | G11C 11/005 257/295 |
| 2014/0068293 | A1 * | 3/2014 | Man | G06F 1/3206 713/320 |
| 2014/0181537 | A1 | 6/2014 | Manne et al. | |
| 2018/0349191 | A1 * | 12/2018 | Dorsey | G06F 9/5044 |
| 2019/0041967 | A1 * | 2/2019 | Ananthakrishnan | G06F 1/3293 |
| 2019/0064893 | A1 * | 2/2019 | Kumar | G06F 9/4893 |
| 2019/0196573 | A1 * | 6/2019 | Gupta | G06F 1/3203 |
| 2021/0018971 | A1 * | 1/2021 | Rotem | G06F 1/263 |
| 2021/0027615 | A1 * | 1/2021 | Deng | G08C 17/02 |
| 2021/0096635 | A1 * | 4/2021 | Kalyanam | G06F 1/3237 |
| 2021/0263773 | A1 * | 8/2021 | Shah | G06F 9/4893 |
| 2022/0100247 | A1 * | 3/2022 | Garg | G06F 1/324 |
| 2023/0062546 | A1 | 3/2023 | Vanderpool et al. | |

OTHER PUBLICATIONS

Genovese L., et al., "Density Functional Theory Calculation on Many-Cores Hybrid Central Processing Unit-Graphic Processing Unit Architectures", American Institute of Physics AIP, The Journal of Chemical Physics, vol. 131, No. 3, 2009, 9 Pages.

* cited by examiner

PERFORMING DYNAMIC MICROARCHITECTURAL THROTTLING OF PROCESSOR CORES BASED ON QUALITY-OF-SERVICE (QoS) LEVELS IN PROCESSOR DEVICES

BACKGROUND

I. Field of the Disclosure

The technology of the disclosure relates generally to power and performance management in multicore processor-based devices, and, in particular, to frequency management for clusters of processor cores of a processor device.

II. Background

Conventional processor devices may implement the Advanced Configuration and Power Interface (ACPI) specification, which defines an open industry standard that includes power management across the processor devices' hardware, operating systems (OSes), and application software. Using functionality defined by the ACPI specification, a processor device can perform frequency management to modify its performance and power consumption. For example, the frequency of the processor device may be decreased when workloads executed by the processor device do not require enhanced performance, and/or do not involve user experiences that necessitate higher performance. Decreasing the frequency of the processor device can decrease power consumption. Conversely, if workloads executed by the processor device require enhanced performance and/or involve user experiences that necessitate higher performance, the frequency of the processor device can be increased. However, increasing the frequency of the processor device also increases power consumption by the processor device.

Some conventional processor devices are implemented as multiple processor cores that are organized into core clusters. Each core cluster may be "synchronous," in that all of the processor cores of the core cluster are clocked using a single clock source such as a phase-locked loop (PLL). Because the processor cores all share the same clock source, a change in frequency for a core cluster affects all of the processor cores within the core cluster. However, the power consumption of the core cluster may be negatively affected when an operating system (OS) scheduler executing on the core cluster schedules workloads on the processor cores that are associated with different Quality-of-Service (QoS) levels. Because each QoS level corresponds to different frequency and power expectations, the frequency of the core cluster may be determined by the highest QoS level of all workloads executing on the multiple processor cores. As a result, workloads that require lower QoS levels nevertheless must execute at the frequency required by the highest QoS level of all workloads executing on the processor cores, leading to increased power consumption by the core cluster.

SUMMARY OF THE DISCLOSURE

Aspects disclosed in the detailed description include performing dynamic microarchitectural throttling of processor cores based on Quality-of-Service (QOS) levels in processor devices. Related apparatus, methods, and computer-readable media are also disclosed. In this regard, a processor device comprises a synchronous core cluster that includes a plurality of processor cores, a throttling selection circuit, and a throttling circuit. The throttling selection circuit of the synchronous core cluster is configured to determine a performance state of a processor core of the plurality of processor cores, and receive, from the processor core, a QoS level associated with a workload scheduled for execution by the processor core. Subsequently (e.g., at periodic intervals), the throttling selection circuit determines a throttling level for the processor core based on the QoS level and the performance state, and provides the throttling level to the throttling circuit. Upon receiving the throttling level, the throttling circuit performs microarchitectural throttling of the processor core based on the throttling level. As used herein, "microarchitectural throttling" refers to modifying the efficiency of instruction execution by the processing core (e.g., by inserting no-operation (NOP) instructions for execution by the processor core, as a non-limiting example) without changing the frequency or voltage of the synchronous core cluster. In this manner, lower performance threads executing on the processor core consume less power without compromising performance requirements, and further make power available to the processor device as a whole.

Some aspects may provide that the throttling selection circuit determines an energy performance preference (EPP) level corresponding to the QoS level, and determines the throttling level based on the QoS level and the performance level by determining the throttling level based on the EPP level and the performance level. In some aspects, during each periodic interval, the throttling selection circuit populates each of a plurality of throttling level look-up tables (LUTs) corresponding to the plurality of processor cores. For example, the throttling selection circuit may calculate an average core frequency corresponding to each EPP level of a plurality of EPP levels. The throttling selection circuit then calculates, for each throttling level of a plurality of throttling levels, a corresponding performance state for the processor core that requires the throttling level to achieve at least the average core frequency. According to some aspects, determining the EPP level corresponding to the QoS level is based on a mapping register that maps the QoS level to the EPP level. Some aspects may provide that determining the EPP level corresponding to the QoS level comprises mapping the QoS level to the EPP level based on the performance state of the processor core.

In some aspects, determining the throttling level based on the EPP level and the performance state may comprise selecting, in a throttling level LUT corresponding to the processor core of the plurality of throttling level LUTs, a row corresponding to the EPP level of a plurality of rows of the throttling level LUT. The throttling selection circuit in such aspects then determines the throttling level based on a column of a lowest performance state in the row that is greater than or equal to the performance state of the processor core.

Some aspects may provide that a dynamic voltage and frequency scaling (DVFS) aggregator circuit of the synchronous core cluster receives, from the plurality of processor cores, a corresponding plurality of EPP hints. The DVFS aggregator circuit selects a cluster performance state for the synchronous core cluster based on the plurality of EPP hints (e.g., by selecting a highest performance state indicated by a plurality of mapping LUTs corresponding to the plurality of processor cores). The DVFS aggregator circuit transmits the cluster performance state to a DVFS circuit of the synchronous core cluster, which then sets a frequency and a voltage for the synchronous core cluster based on the cluster performance state.

In another aspect, a processor device is provided. The processor device comprises a synchronous core cluster that includes a plurality of processor cores, a throttling selection circuit, and a throttling circuit. The throttling selection circuit is configured to determine a performance state of a processor core of the plurality of processor cores. The throttling selection circuit is further configured to receive, from the processor core, a QoS level associated with a workload scheduled for execution by the processor core. The throttling selection circuit is also configured to determine a throttling level for the processor core, based on the QoS level and the performance state. The throttling selection circuit is additionally configured to provide the throttling level to the throttling circuit. The throttling circuit is configured to receive the throttling level, and perform microarchitectural throttling of the processor core based on the throttling level.

In another aspect, a processor device is provided. The processor device comprises means for determining a performance state of a processor core of a plurality of processor cores of a synchronous core cluster of the processor device. The processor device further comprises means for receiving, from the processor core, a QoS level associated with a workload scheduled for execution by the processor core. The processor device also comprises means for determining a throttling level for the processor core, based on the QoS level and the performance state. The processor device additionally comprises means for performing microarchitectural throttling of the processor core based on the throttling level.

In another aspect, a method for performing dynamic microarchitectural throttling of processor cores based on QoS levels is provided. The method comprises determining, by a throttling selection circuit of a synchronous core cluster of a processor device, a performance state of a processor core of a plurality of processor cores of the synchronous core cluster. The method further comprises receiving, by the throttling selection circuit, a QoS level associated with a workload scheduled for execution by the processor core. The method also comprises determining, by the throttling selection circuit, a throttling level for the processor core, based on the QoS level and the performance state. The method additionally comprises providing, by the throttling selection circuit, the throttling level to a throttling circuit of the synchronous core cluster. The method further comprises receiving, by the throttling circuit, the throttling level. The method also comprises performing, by the throttling circuit, microarchitectural throttling of the processor core based on the throttling level.

In another aspect, a non-transitory computer-readable medium is disclosed. The non-transitory computer-readable medium stores computer-executable instructions that, when executed, cause a processor device of a processor-based device to determine a performance state of a processor core of a plurality of processor cores of a synchronous core cluster of the processor device. The computer-executable instructions further cause the processor device to receive a QoS level associated with a workload scheduled for execution by the processor core. The computer-executable instructions also cause the processor device to determine a throttling level for the processor core, based on the QoS level and the performance state. The computer-executable instructions additionally cause the processor device to perform microarchitectural throttling of the processor core based on the throttling level.

DETAILED DESCRIPTION

Figure 1:
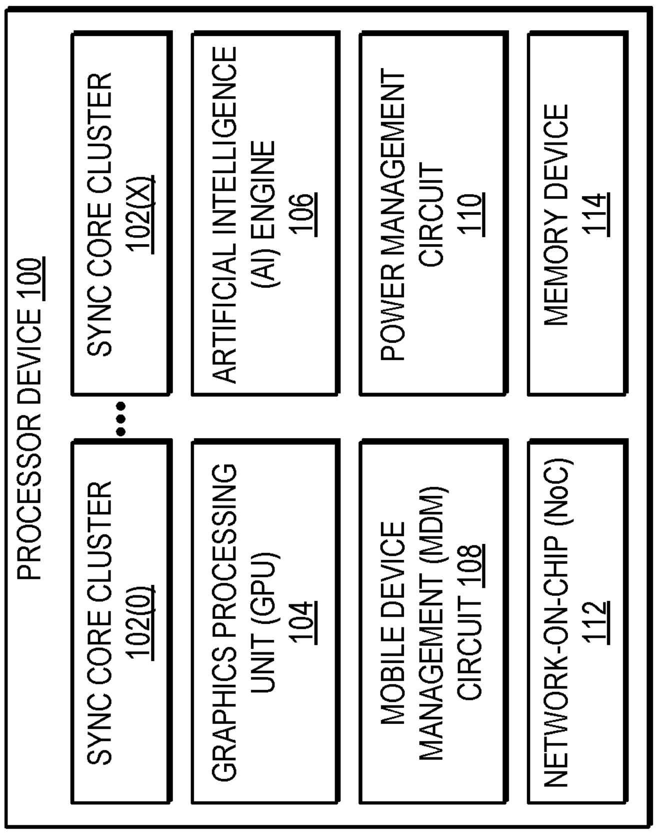
FIG. 1 is a block diagram of an exemplary processor-based device that includes synchronous core clusters configured to perform dynamic microarchitectural throttling of processor cores based on Quality-of-Service (QOS) levels, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include performing dynamic microarchitectural throttling of processor cores based on Quality-of-Service (QOS) levels in processor devices. Related apparatus, methods, and computer-readable media are also disclosed. In this regard, a processor device comprises a synchronous core cluster that includes a plurality of processor cores, a throttling selection circuit, and a throttling circuit. The throttling selection circuit of the synchronous core cluster is configured to determine a performance state of a processor core of the plurality of processor cores, and receive, from the processor core, a QoS level associated with a workload scheduled for execution by the processor core. Subsequently (e.g., at periodic intervals), the throttling selection circuit determines a throttling level for the processor core based on the QoS level and the performance state, and provides the throttling level to the throttling circuit. Upon receiving the throttling level, the throttling circuit performs microarchitectural throttling of the processor core based on the throttling level. As used herein, "microarchitectural throttling" refers to modifying the efficiency of instruction execution by the processing core (e.g., by inserting no-operation (NOP) instructions for execution by the processor core, as a non-limiting example) without changing the frequency or voltage of the synchronous core cluster. In this manner, lower performance threads executing on the processor core consume less power without compromising performance requirements, and further make power available to the processor device as a whole.

Some aspects may provide that the throttling selection circuit determines an energy performance preference (EPP) level corresponding to the QoS level, and determines the throttling level based on the QoS level and the performance level by determining the throttling level based on the EPP level and the performance level. In some aspects, during each periodic interval, the throttling selection circuit populates each of a plurality of throttling level look-up tables (LUTs) corresponding to the plurality of processor cores. For example, the throttling selection circuit may calculate an average core frequency corresponding to each EPP level of a plurality of EPP levels. The throttling selection circuit then calculates, for each throttling level of a plurality of throttling levels, a corresponding performance state for the processor core that requires the throttling level to achieve at least the average core frequency. According to some aspects, determining the EPP level corresponding to the QoS level is based on a mapping register that maps the QoS level to the EPP level. Some aspects may provide that determining the EPP level corresponding to the QoS level comprises mapping the QoS level to the EPP level based on the performance state of the processor core.

In some aspects, determining the throttling level based on the EPP level and the performance state may comprise selecting, in a throttling level LUT corresponding to the processor core of the plurality of throttling level LUTs, a row corresponding to the EPP level of a plurality of rows of the throttling level LUT. The throttling selection circuit in such aspects then determines the throttling level based on a column of a lowest performance state in the row that is greater than or equal to the performance state of the processor core.

Some aspects may provide that a dynamic voltage and frequency scaling (DVFS) aggregator circuit of the synchronous core cluster receives, from the plurality of processor cores, a corresponding plurality of EPP hints. The DVFS aggregator circuit selects a cluster performance state for the synchronous core cluster based on the plurality of EPP hints (e.g., by selecting a highest performance state indicated by a plurality of mapping LUTs corresponding to the plurality of processor cores). The DVFS aggregator circuit transmits the cluster performance state to a DVFS circuit of the synchronous core cluster, which then sets a frequency and a voltage for the synchronous core cluster based on the cluster performance state.

In this regard, FIG. 1 is a block diagram of an exemplary processor device 100 (also referred to a "processor" or a "CPU"). The processor device 100 may comprise an in-order or an out-of-order processor (OoP), and/or may be one of a plurality of processor devices 100. Examples of the processor device 100 may include, but are not limited to, a digital signal processor (DSP), general-purpose microprocessor, application specific integrated circuit (ASIC), field programmable logic array (FPGA), or other equivalent integrated or discrete logic circuitry.

As seen in FIG. 1, the processor device 100 comprises a plurality of synchronous core clusters (captioned as "SYNC CORE CLUSTER" in FIG. 1) 102(0)-102(X), each of which comprises a plurality of processor cores (not shown). The processor device 100 in the example of FIG. 1 also comprises a graphics processing unit (GPU) 104 for performing graphical operations. As a non-limiting example, the GPU 104 may comprise a dedicated hardware unit having fixed functionality and programmable components for rendering graphics and executing GPU applications. The GPU 104 may also include a DSP, general-purpose microprocessor, ASIC, FPGA, or other equivalent integrated or discrete logic circuitry, which are not shown in FIG. 1 for the sake of clarity.

The processor device 100 of FIG. 1 further comprises additional exemplary elements, including an artificial intelligence (AI) engine 106, a mobile device management (MDM) circuit 108, a power management circuit 110, a network-on-chip (NoC) 112, and a memory device 114. The AI engine 106 of the processor device 100 comprises circuitry and logic for providing AI-based functionality such as search, speech recognition, text and/or image generation, and the like, as non-limiting examples. The MDM circuit 108 provides functionality for provisioning, configuring, updating, and/or securing a mobile device into which the processor device 100 is integrated. The power management circuit 110 provides high-level performance and power management functionality for the processor device 100 as a whole, while the NoC 112 is configured to manage communications between the different devices that comprise the processor device 100. Finally, the memory device 114 provides storage of and access to data used by the processor device 100, and, in some aspects, may comprise a Double Data Rate (DDR) Synchronous Dynamic Random-Access Memory (SDRAM) device, as a non-limiting example.

The processor device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor device 100 may include elements in addition to those illustrated in FIG. 1, and/or may include more or fewer of the elements illustrated in FIG. 1. For example, the processor device 100 may further include caches, controllers, communications buses, and/or persistent storage devices, which are omitted from FIG. 1 for the sake of clarity.

Figure 2:
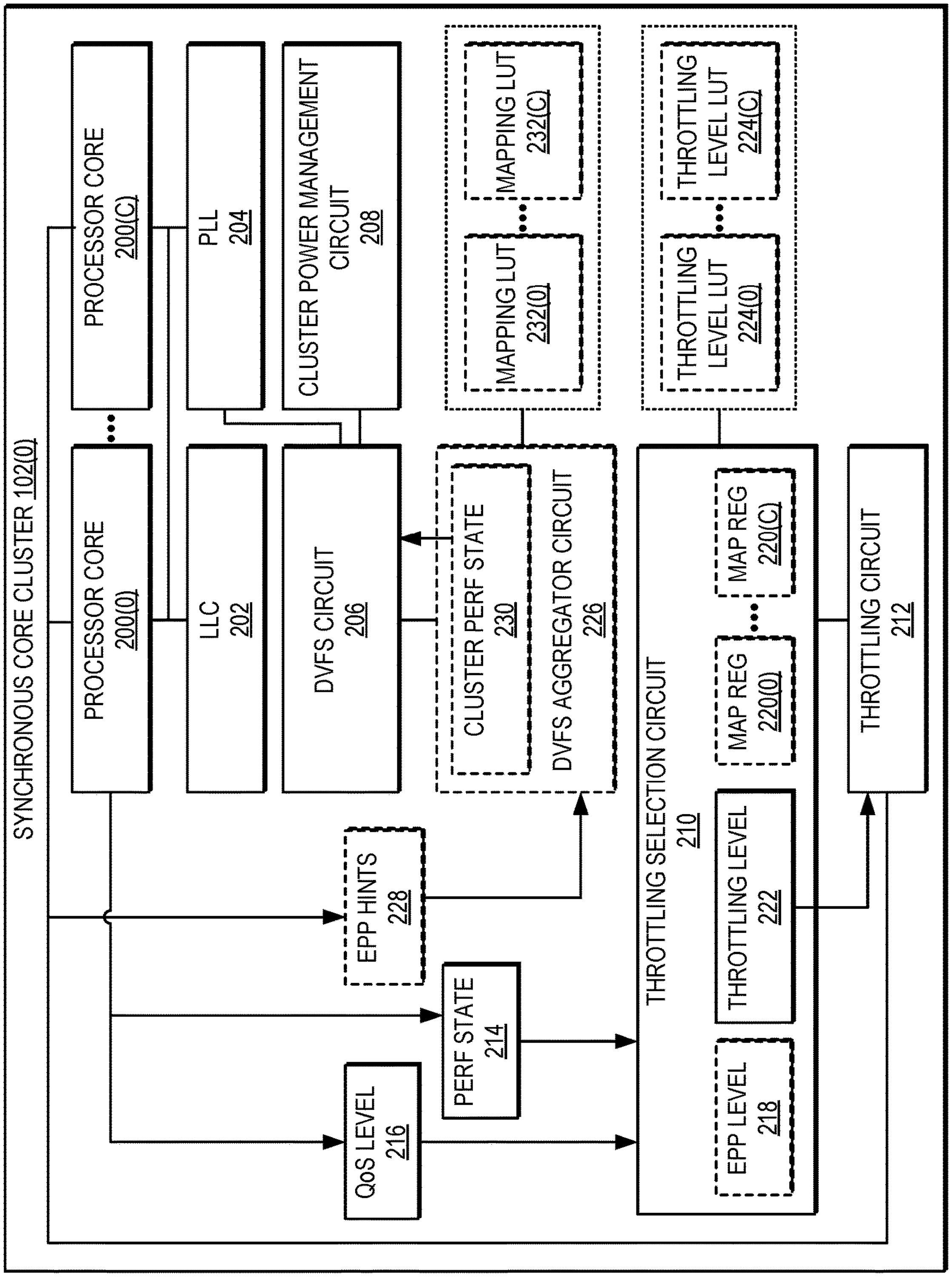
FIG. 2 is a diagram illustrating, in greater detail, one of synchronous core clusters of FIG. 1, comprising a throttling selection circuit and a dynamic voltage and frequency scaling (DVFS) circuit, according to some aspects.

FIG. 2 illustrates exemplary elements of the synchronous core cluster 102(0) of FIG. 1 in greater detail. As seen in FIG. 2, the synchronous core cluster 102(0) includes a plurality of processor cores 200(0)-200(C). The processor cores 200(0)-200(C) of the synchronous core cluster 102(0) are communicatively coupled to a last-level cache (LLC) (captioned as "LLC" in FIG. 2) 202 that stores frequently accessed data for quicker access, and to a phase-locked loop (PLL) (captioned as "PLL" in FIG. 2) 204 that provides a clock signal to the processor cores 200(0)-200(C) and the LLC 202. As used herein, the term "synchronous" used in reference to the synchronous core cluster 102(0) refers to the fact that, because the processor cores 200(0)-200(C) and the LLC 202 all receive the same clock signal provided by the PLL 204, the processor cores 200(0)-200(C) and the LLC 202 all operate at the same frequency. The synchronous core cluster 102(0) may be placed in one of a plurality of performance states, each of which corresponds to a frequency and voltage combination at which all of the processor cores 200(0)-200(C) operate. The frequency and voltage at which the processor cores 200(0)-200(C) of the synchronous core cluster 102(0) operate is controlled by a DVFS circuit 206, and performance and power management for the synchronous core cluster 102(0) is handled by a cluster power management circuit 208. It is to be understood that, while FIG. 1 only shows exemplary elements of the synchronous core cluster 102(0), each of the synchronous core clusters 102(0)-102(C) include elements corresponding to the illustrated elements of the synchronous core cluster 102(0). It is to be further understood that the synchronous core cluster 102(0) may include additional elements that are not illustrated in FIG. 2 for the sake of clarity.

Because the processor cores 200(0)-200(C) all operate at the same frequency, a change in frequency (e.g., resulting from a change in a performance state) of the synchronous core cluster 102(0) affects all of the processor cores 200(0)-200(C) within the synchronous core cluster 102(0). When an operating system (OS) scheduler that is executing on the processor device 100 of FIG. 1 schedules workloads on the processor cores 200(0)-200(C) that are associated with different QoS levels, the frequency of the synchronous core cluster 102(0) may be determined by the highest QoS level of all workloads executing on the processor cores 200(0)-200(C). For example, if a workload executing on the processor core 200(0) is associated with a high QoS level, the DVFS circuit 206 and/or the cluster power management circuit 208 may place the synchronous core cluster 102(0) in a higher performance state (corresponding to a higher frequency) to satisfy the high QoS requirement. This results in all of the processor cores 200(0)-200(C) operating at the higher processor frequency. If, e.g., the processor core 200(C) is concurrently executing a workload that requires a low QoS level, the processor core 200(C) must still execute at the higher processor frequency, which results in unnecessary power consumption by the processor core 200(C).

In this regard, the synchronous core cluster 102(0) provides a throttling selection circuit 210 and a throttling circuit 212 that are configured to provide dynamic microarchitectural throttling of the processor cores 200(0)-200(C) based on QoS levels. As used herein, "microarchitectural throttling" refers to modifying the efficiency of instruction execution on one or more of the processor cores 200(0)-200(C) without modifying the frequency or voltage at which the synchronous core cluster 102(0) is operating. It is to be understood that, while FIG. 2 shows the throttling selection circuit 210 as an element separate from the cluster power management circuit 208, some aspects may provide that the throttling selection circuit 210 and the cluster power management circuit 208 may be integrated into a single element.

Using the processor core 200(0) as an example, the throttling selection circuit 210 in exemplary operation determines a performance state (captioned as "PERF STATE" in FIG. 2) 214 of the processor core 200(0). The performance state 214 represents a current frequency and voltage combination under which the synchronous core cluster 102(0) (and, by extension, the processor cores 200(0)-200(C)) is currently operating. The throttling selection circuit 210 also receives a QoS level 216 associated with a workload scheduled for execution by the processor core 200(0). The QoS level 216 is specified by the OS executing on the processor device 100, and represents a quality of service level requested by the OS for the executing workload.

The throttling selection circuit 210 then performs a series of operations that, in some aspects, may occur at periodic intervals. For example, the throttling selection circuit 210 may determine an EPP level 218 corresponding to the QoS level 216, wherein the EPP level 218 comprises an indicator having a value defined by the processor device 100 as representing a system bias towards performance or energy efficiency, with different values for the EPP level 218 being associated with different frequency and voltage preferences. Because the number of EPP levels supported by the synchronous core cluster 102(0) and the number of QoS levels supported by the OS may vary, the throttling selection circuit 210 may comprise a plurality of mapping registers (captioned as "MAP REG" in FIG. 2) 220(0)-220(C) that correspond to the processor cores 200(0)-200(C). The mapping registers 220(0)-220(C) each may be periodically updated by the throttling selection circuit 210 to map a current QoS level of a workload executing on the corresponding processor core 200(0)-200(C) to an EPP level supported by the synchronous core cluster 102(0). Thus, for example, the mapping register 220(0) may map the QoS level 216 to the EPP level 218 for the processor core 200(0). Alternatively or additionally, the throttling selection circuit 210 in some aspects may map the QoS level 216 to the EPP level 218 based on the current performance state 214 of the processor core 200(0).

The throttling selection circuit 210 then determines a throttling level 222 for the processor core 200(0) based on the QoS level 216 and the performance state 214 by, e.g., determining the throttling level 222 based on the EPP level 218 and the performance state 214. The throttling level 222 represents a degree to which the performance of the processor core 200(0) should be reduced so that, when operating at the performance state 214, the rate of instruction execution by the processor core 200(0) corresponds to the EPP level 218. In some aspects, the throttling level 222 may comprise a value between zero (0) and 15, with a value of zero (0) representing no throttling and a value of 15 representing a highest throttling level (i.e., a lowest rate of instruction execution).

The throttling selection circuit 210 provides the throttling level 222 to the throttling circuit 212 of the synchronous core cluster 102(0), which then performs microarchitectural throttling of the processor core 200(0) based on the throttling level 222. This results in the processor core 200(0) executing instructions at a slower effective rate than would otherwise occur at the current performance state 214, and reduces the power consumption of the processor core 200(0). For example, the throttling circuit 212 may perform microarchitectural throttling by inserting NOP instructions (not shown) for execution by the processor core 200(0). When executed by the processor core 200(0), the NOP instructions delay the execution of other instructions by the processor core 200(0) (resulting in an effective rate of instruction execution that corresponds to the EPP level 218) while causing the processor core 200(0) to consume less power.

In some aspects, the throttling selection circuit 210 may determine the throttling level 222 using a plurality of throttling level LUTs 224(0)-224(C) that correspond to the processor cores 200(0)-200(C). An exemplary aspect of the throttling level LUTs 224(0)-224(C) and operations for accessing and populating the throttling level LUTs 224(0)-224(C) is discussed in greater detail below with respect to FIG. 3.

Some aspects may further provide that a performance state at which the synchronous core cluster 102(0) is set to operate is determined using a DVFS aggregator circuit 226. In such aspects, the processor cores 200(0)-200(C) provide a corresponding plurality of EPP hints 228 to indicate a desired EPP level for each of the processor cores 200(0)-200(C). Upon receiving the EPP hints 228, the DVFS aggregator circuit 226 selects a cluster performance state (captioned as "CLUSTER PERF STATE" in FIG. 2) 230 for the synchronous core cluster 102(0) based on the EPP hints 228. According to some such aspects, the DVFS aggregator circuit 226 may employ a plurality of mapping LUTs 232(0)-232(C) that correspond to the plurality of processor cores 200(0)-200(C), and that map each of the EPP hints 228 to a performance state for the corresponding processor cores 200(0)-200(C). Selecting the cluster performance state 230 thus may comprise selecting a highest performance state indicated by the plurality of mapping LUTs 232(0)-232(C) based on the EPP hints 228. The DVFS aggregator circuit 226 transmits the cluster performance state 230 to the DVFS circuit 206, which then sets a frequency and a voltage for the synchronous core cluster 102(0) based on the cluster performance state 230.

Figure 3:
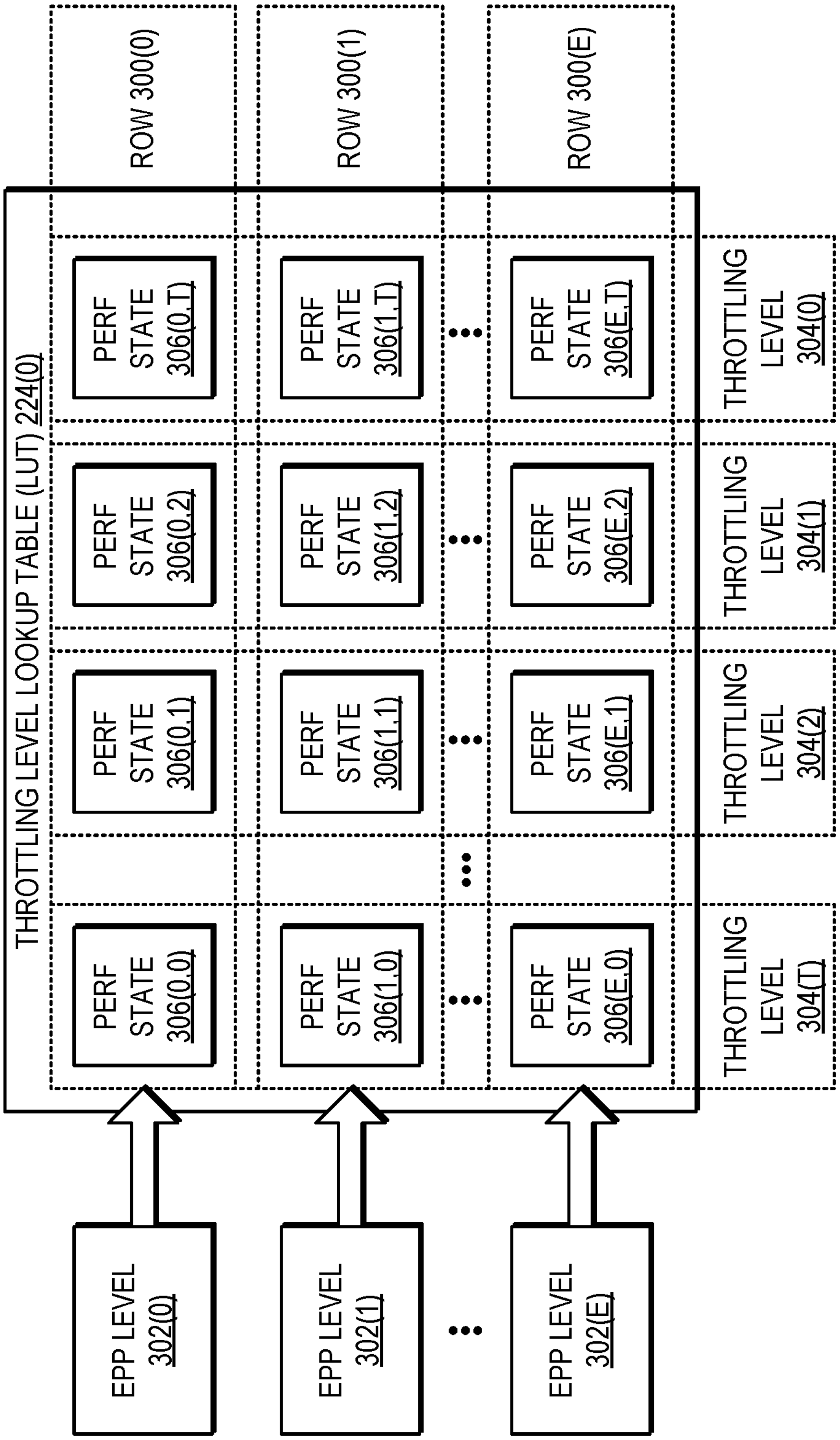
FIG. 3 is a diagram illustrating an exemplary throttling level look-up table (LUT) used by the throttling selection circuit of FIG. 2 to map energy performance preference (EPP) levels and performance states to throttling levels, according to some aspects.

FIG. 3 illustrates in greater detail the throttling level LUT 224(0) of FIG. 2 according to some aspects. As seen in FIG. 3, the throttling level LUT 224(0) comprises a plurality of rows 300(0)-300(E), each corresponding to an EPP level 302(0)-302(E). Thus, for example, the EPP level 302(0) may represent an energy-efficient level associated with a lower frequency and voltage combination, the EPP level 302(1) may represent an energy-balanced level associated with an intermediate frequency and voltage combination, and the EPP level 302(E) may represent a performance level associated with a higher frequency and voltage combination. The columns of the throttling level LUT 224(0) represent a plurality of throttling levels 304(0)-304(T), arranged in order of decreasing throttling level. Accordingly, the throttling level 304(0) may represent a lowest throttling level (e.g., no throttling), while the throttling level 304(T) may represent a highest throttling level.

The entries in the throttling level LUT 224(0) represent performance states (captioned as "PERF STATE" in FIG. 3) 306(0,0)-306(E,T) for the processor core 200(0) of FIG. 2 that corresponds to the throttling level LUT 224(0). Each of the performance states 306(0,0)-306(E,T) indicates a performance state of the processor core 200(0) that, when microarchitectural throttling at the level indicated by the corresponding throttling level 304(0)-304(T) is applied, would result in the corresponding EPP level 302(0)-302(E). For example, if the processor core 200(0) were placed in the performance state 306(0,1) and the corresponding throttling level 304(2) were applied, the resulting performance of the processor core 200(0) would correspond to the EPP level 302(0).

As noted above with respect to FIG. 2, the throttling selection circuit 210 in some aspects may use the throttling level LUT 224(0) when determining the throttling level 222 for the processor core 200(0) based on the EPP level 302(0) and the performance state 214 (e.g., the performance state representing a current frequency and voltage combination under which the processor core 200(0) is operating). In such aspects, determining the throttling level 222 may involve the throttling selection circuit 210 selecting the row corresponding to the EPP level 218 of FIG. 2 (e.g., the row 300(0) corresponding to the EPP level 302(0)), and then determining the throttling level 222 based on a column of a lowest performance state in the row 300(0) that is greater than or equal to the performance state 214 of the processor core 200(0). Thus, for instance, if the performance state 306(0,2) in the row 300(0) was the lowest of the performance states 306(0,0)-306(0,T) that is greater than or equal to the performance state 214, the throttling selection circuit 210 would select the throttling level 304(1) of FIG. 3 as the throttling level 222 of FIG. 2.

Some aspects may further provide that the throttling selection circuit 210 periodically populates each of the plurality of throttling level LUTs 224(0)-224(C) corresponding to the plurality of processor cores 200(0)-200(C). In such aspects, the throttling selection circuit 210 may perform a series of operations for each EPP level of the plurality of EPP levels 302(0)-302(E). The throttling selection circuit 210 may first calculate an average core frequency corresponding to each EPP level 302(0)-302(E). The throttling selection circuit 210 then calculates, for each throttling level of the plurality of throttling levels 304(0)-304(T), the corresponding performance state 306(0,0)-306(E,T) for the processor core 200(0) that requires that throttling level to achieve at least the average core frequency.

Figure 4:
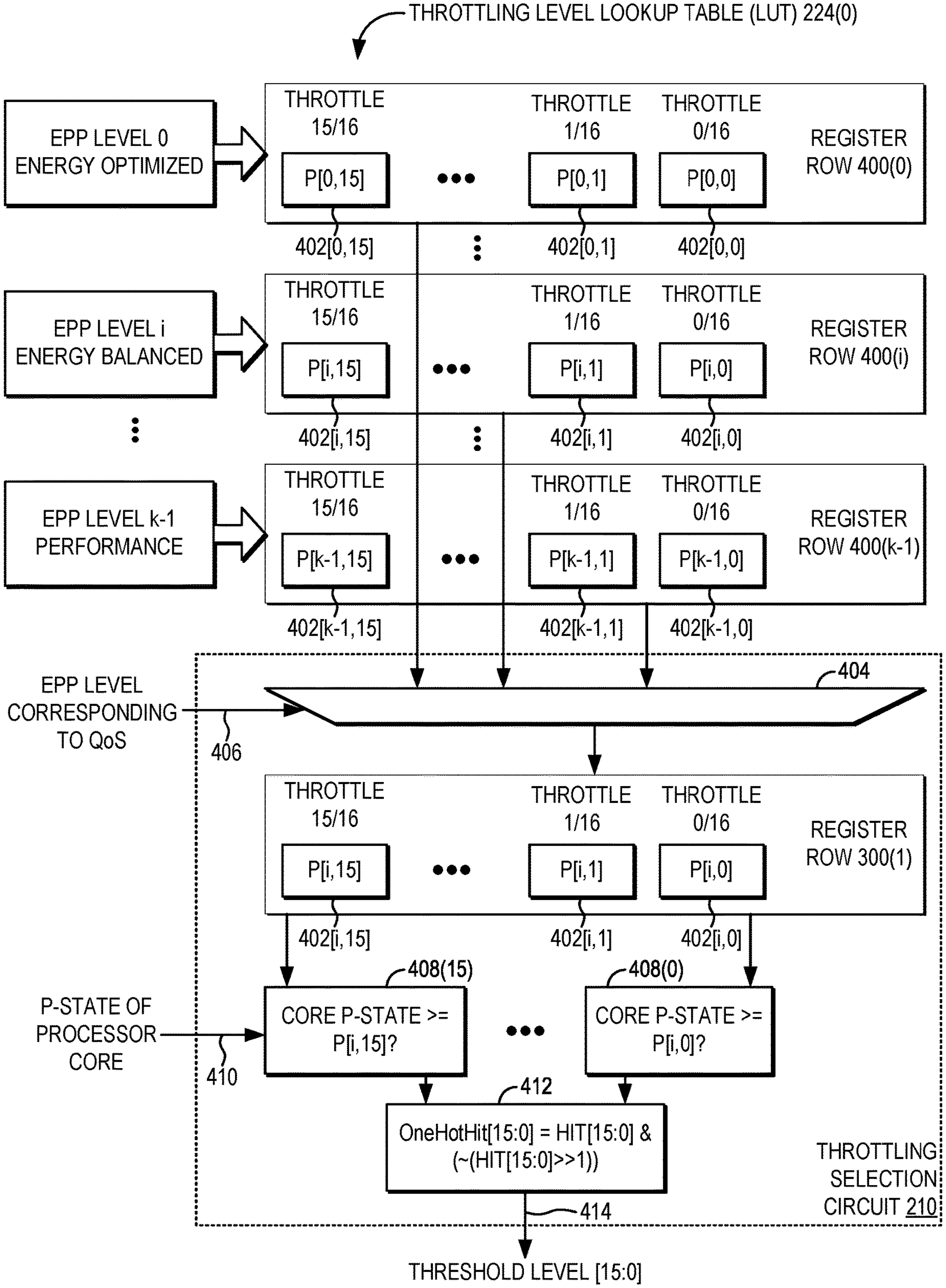
FIG. 4 is a diagram illustrating an exemplary physical implementation of the throttling selection circuit of FIG. 2 and the throttling level LUT of FIGS. 2 and 3, according to some aspects.

FIG. 4 illustrates an exemplary physical implementation of the throttling selection circuit 210 of FIG. 2 and the throttling level LUT 224(0) of FIGS. 2 and 3 according to some aspects. In FIG. 4, the throttling level LUT 224(0) comprises a number k of register rows 400(0)-400(k−1) comprising a plurality of registers 402(0,0)-402(k−1,15), with the registers 402(0,0)-402(0,15) making up the register row 400(0), the registers 402(*i*,0)-402(*i*,15) making up the register row 400(*i*), and the registers 402(k−1,0)-402(k−1,15) making up the register row 400(k−1). The register rows 400(0)-400(k−1) correspond to the plurality of rows 300(0)-300(E) of FIG. 3, and are each associated with an EPP level. In example of FIG. 4, the register row 400(0) is associated with EPP level 0 representing an energy-optimized EPP level. The register row 400(*i*) is associated with EPP level i, which represents an energy-balanced EPP level, and the register row 400(k−1) is associated with EPP level k−1 representing a performance EPP level.

As seen in FIG. 4, the position of each of the registers 402(0,0)-402(*k*−1,15) within the register rows 400(0)-400(*k*−1) corresponds to a throttling level, arranged in decreasing order. Thus, for example, the register 402(0,0) is associated with a lowest throttling level (e.g., no throttling), while the register 402(0,15) may represent a highest throttling level (e.g., a throttling level of 15/16, indicating that processor core performance is throttled to 1/16 of unthrottled performance). Each of the registers 402(0,0)-402(*k*−1,15) is populated with an index indicating a performance state (captioned as "P" in FIG. 4) for the processor core 200(0) of FIG. 2 that corresponds to the throttling level associated with that register. The performance states indicate performance states of the processor core 200(0) that, when microarchitectural throttling at the level indicated by the corresponding throttling level is applied, would result in the corresponding EPP level associated with the register row 400(0)-400(*k*−1). Thus, for instance, if the processor core 200(0) were placed in the performance state 306(0,1) and the corresponding throttling level 0/16 were applied, the resulting performance of the processor core 200(0) would correspond to the EPP level 0 associated with the register row 400(0).

In exemplary operation, the throttling selection circuit 210 inputs the EPP level corresponding to the QoS associated with the workload scheduled for execution by the processor core 200(0) into selection logic 404, as indicated by arrow 406. In this example, the selection logic 404 determines that the register row 400(*i*) corresponds to the EPP level, and thus selects the register row 400(*i*) for further processing. The throttling selection circuit 210 then inputs the performance state of the processor core 200(0) into comparison logic elements 408(0)-408(15) corresponding to the registers 402(*i*,0)-402(*i*,15), as indicated by arrow 410. Each of the comparison logic elements 408(0)-408(15) determines whether the performance state of the processor core 200(0) is greater than or equal to the performance state stored in the corresponding register 402(*i*,0)-402(*i*,15) (i.e., the performance states P[i,0]-P[i,15]). The results are routed to throttling selection logic 412 as a 16-bit value where bits having a value of one (1) indicate that the performance state of the processor core 200(0) is greater than or equal the performance state stored in the corresponding register 402

(*i*,0)-402(*i*,15). The throttling selection logic 412 determines which of the performance states P[i,0]-P[i,15] is the lowest performance states that is greater than or equal to the performance state of the performance state of the processor core, and outputs a 16-bit threshold level having one bit set to a value of one (1) to indicate which throttling level should be applied, as indicated by arrow 414.

To illustrate exemplary operations performed by the processor device 100 of FIG. 1 for performing dynamic microarchitectural throttling of processor cores based on QoS levels according to some aspects, FIGS. 5A-5D provide a flowchart illustrating exemplary operations 500. For the sake of clarity, elements of FIGS. 1-3 are referenced in describing FIGS. 5A-5D. It is to be understood that, in some aspects, some of the exemplary operations 500 may be performed in an order other than that illustrated herein, and/or may be omitted.

Figure 5A:
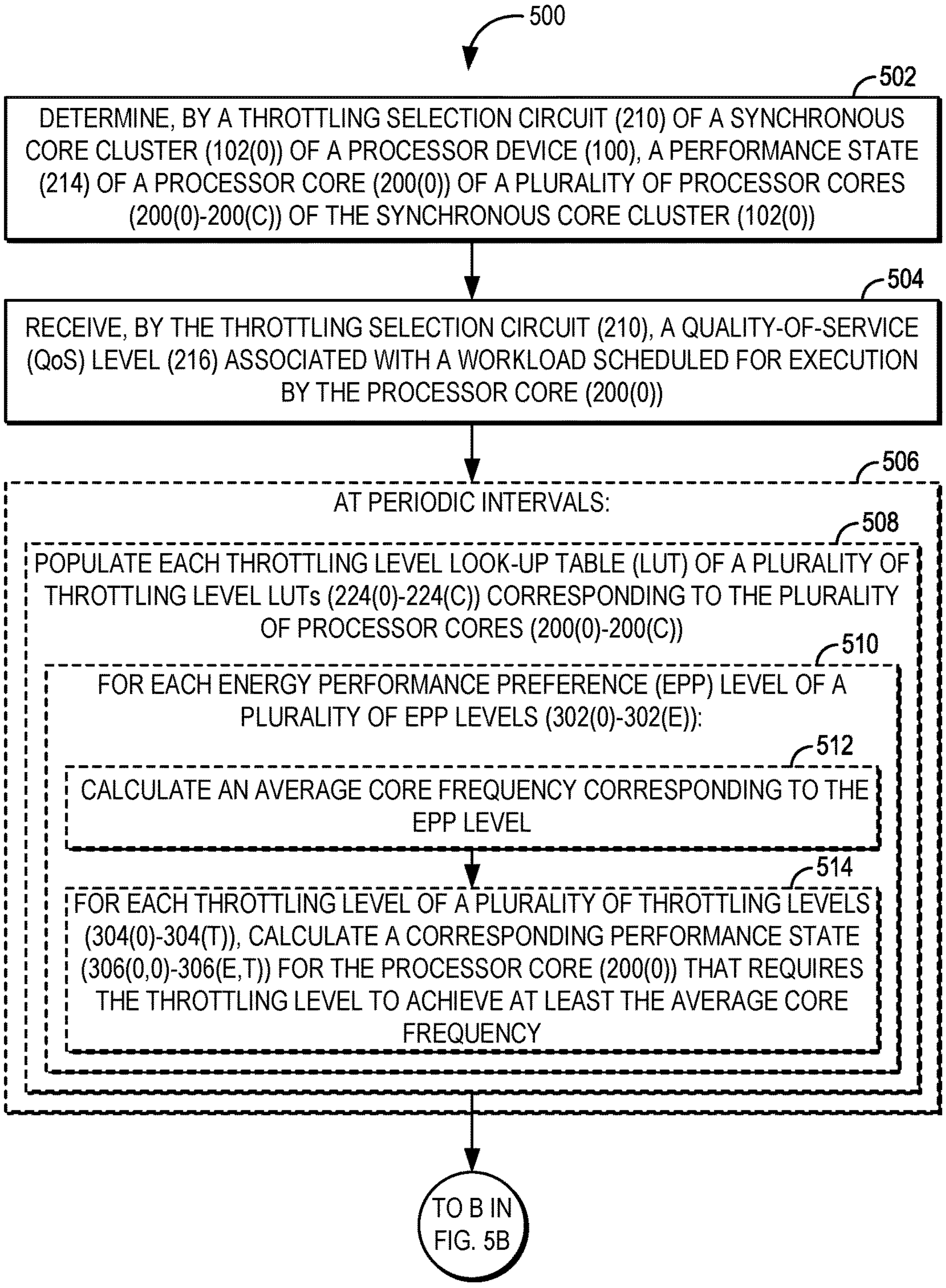
FIGS. 5A-5D provide a flowchart illustrating exemplary operations performed by the processor device of FIG. 1 for performing dynamic microarchitectural throttling of processor cores based on QoS levels, according to some aspects.

The exemplary operations 500 begin in FIG. 5A with a throttling selection circuit (e.g., the throttling selection circuit 210 of FIG. 2) of a synchronous core cluster (e.g., the synchronous core cluster 102(0)) of FIGS. 1 and 2) of a processor device (such as the processor device 100 of FIG. 1) determining a performance state (e.g., the performance state 214 of FIG. 2) of a processor core of a plurality of processor cores (e.g., the processor core 200(0) of the plurality of processor cores 200(0)-200(C) of FIG. 2) of the synchronous core cluster 102(0) (block 502). The throttling selection circuit 210 receives a QoS level (e.g., the QoS level 216 of FIG. 2) associated with a workload scheduled for execution by the processor core 200(0) (block 504).

In some aspects, a series of operations are then performed at periodic intervals (block 506). According to some such aspects, the throttling selection circuit 210 populates each throttling LUT of a plurality of throttling level LUTs (such as the throttling level LUTs 224(0)-224(C) of FIG. 2) corresponding to the plurality of processor cores 200(0)-200(C) (block 508). Some such aspects may provide that the operations of block 508 for populating each throttling LUT comprises performing a series of operations for each EPP level of a plurality of EPP levels (such as the EPP levels 302(0)-302(E) of FIG. 3) (block 510). The throttling selection circuit 210 in such aspects may calculate an average core frequency corresponding to the EPP level (block 512). The throttling selection circuit 210 then calculates, for each throttling level of a plurality of throttling levels (e.g., the throttling levels 304(0)-304(T) of FIG. 3), a corresponding performance state (such as the performance states 306(0,0)-306(E,T) of FIG. 3) for the processor core 200(0) that requires the throttling level to achieve at least the average core frequency (block 514). The exemplary operations 500 continue at block 516 of FIG. 5B.

Figure 5B:
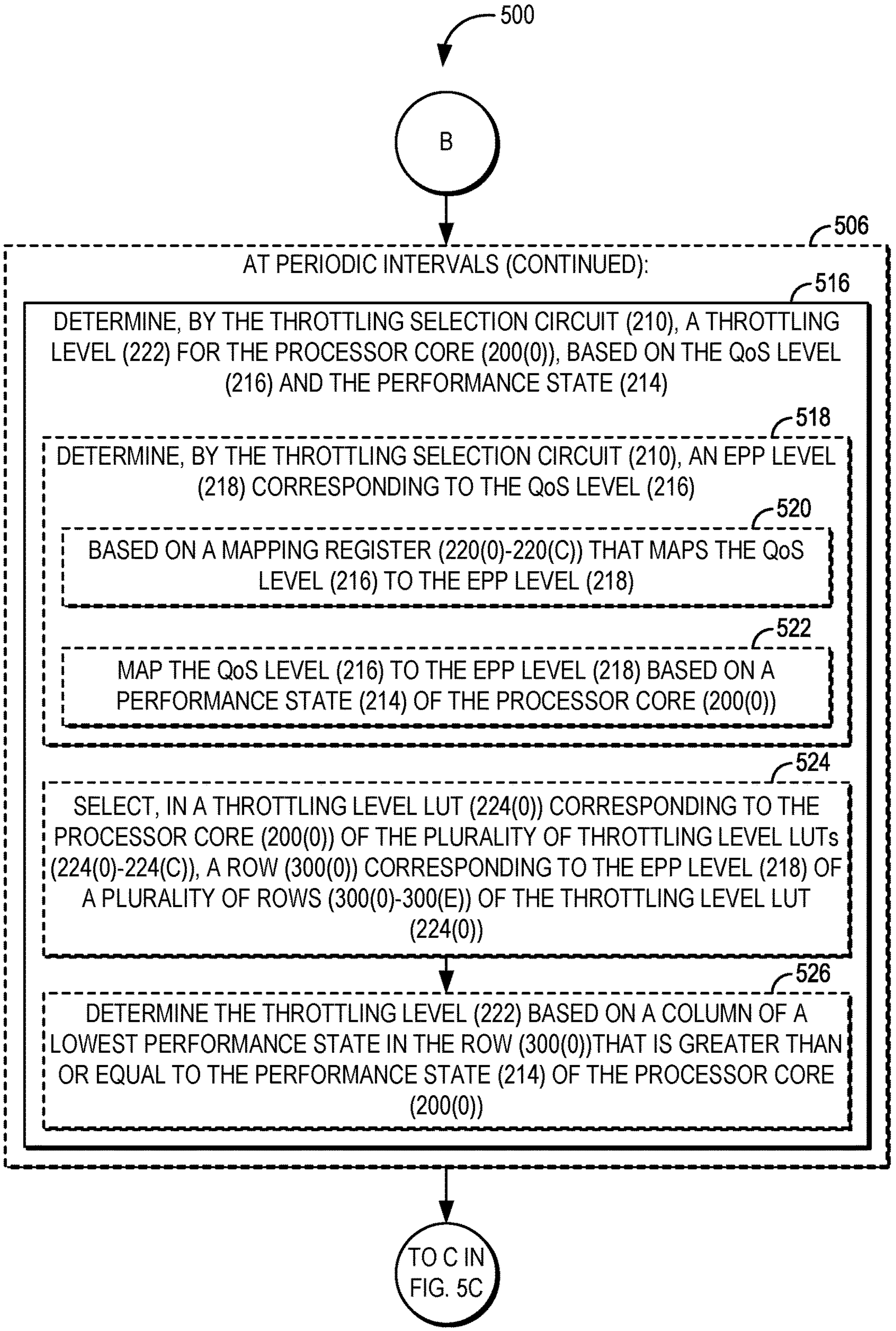

Turning now to FIG. 5B, the operations performed at periodic intervals according to some aspects continue (block 506). The throttling selection circuit 210 determines a throttling level (e.g., the throttling level 222 of FIG. 2) for the processor core 200(0), based on the QoS level 216 and the performance state 214 (block 516). Some aspects may provide that the operations of block 516 for determining the throttling level 222 may comprise the throttling selection circuit 210 determining an EPP level (such as the EPP level 218 of FIG. 2) corresponding to the QoS level 216 (block 518). According to some aspects, the operations of block 518 for determining the EPP level 218 may comprise determining the EPP level 218 based on a mapping register (e.g., the mapping registers 220(0)-220(C) of FIG. 2) that maps the QoS level 216 to the EPP level 218 (block 520). Some aspects may provide that the operations of block 518 for determining the EPP level 218 comprise mapping the QoS level 216 to the EPP level 218 based on a performance state (e.g., the performance state 214 of FIG. 2) of the processor core 200(0) (block 522).

In some aspects, the operations of block 516 for determining the throttling level 222 may comprise the throttling selection circuit 210 selecting, in a throttling level LUT (e.g., the throttling level LUT 224(0) of FIG. 2) corresponding to the processor core 200(0) of the plurality of throttling level LUTs (e.g., the throttling level LUTs 224(0)-224(C) of FIG. 2), a row (such as the row 300(0) of FIG. 3) corresponding to the EPP level 218 of a plurality of rows (e.g., the rows 300(0)-300(E) of FIG. 3) of the throttling level LUT 224(0) (block 524). The throttling selection circuit 210 in such aspects then determine the throttling level 222 based on a column of a lowest performance state in the row 300(0) that is greater than or equal to the performance state 214 of the processor core 200(0) (block 526). The exemplary operations 500 then continue at block 528 of FIG. 5C.

Figure 5C:
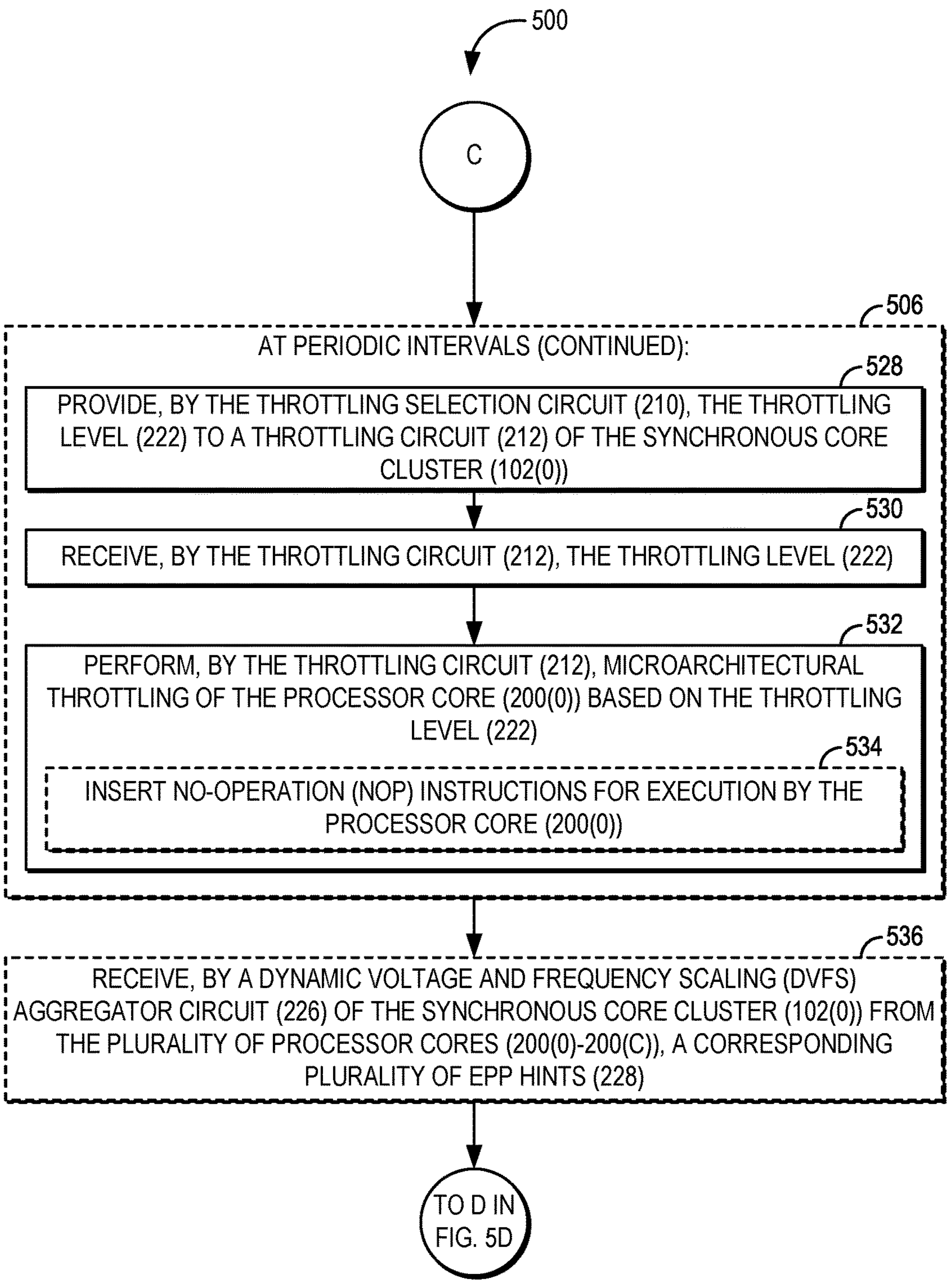

Referring now to FIG. 5C, the operations performed at periodic intervals in some aspects continue (block 506). The throttling selection circuit 210 provides the throttling level 222 to a throttling circuit (e.g., the throttling circuit 212 of FIG. 2) of the synchronous core cluster 102(0) (block 528). The throttling circuit 212 receives the throttling level 222 (block 530). The throttling circuit 212 then performs microarchitectural throttling of the processor core 200(0) based on the throttling level 222 (block 532). In some aspects, the operations of block 532 for performing microarchitectural throttling may comprise the throttling circuit 212 inserting NOP instructions for execution by the processor core 200(0) (block 534).

Some aspects may provide that a DVFS aggregator circuit (e.g., the DVFS aggregator circuit 226 of FIG. 2) of the synchronous core cluster 102(0) receives, from the plurality of processor cores 200(0)-200(C), a corresponding plurality of EPP hints (such as the EPP hints 228 of FIG. 2) (block 536). The exemplary operations 500 then continue at block 538 of FIG. 5D.

Figure 5D:
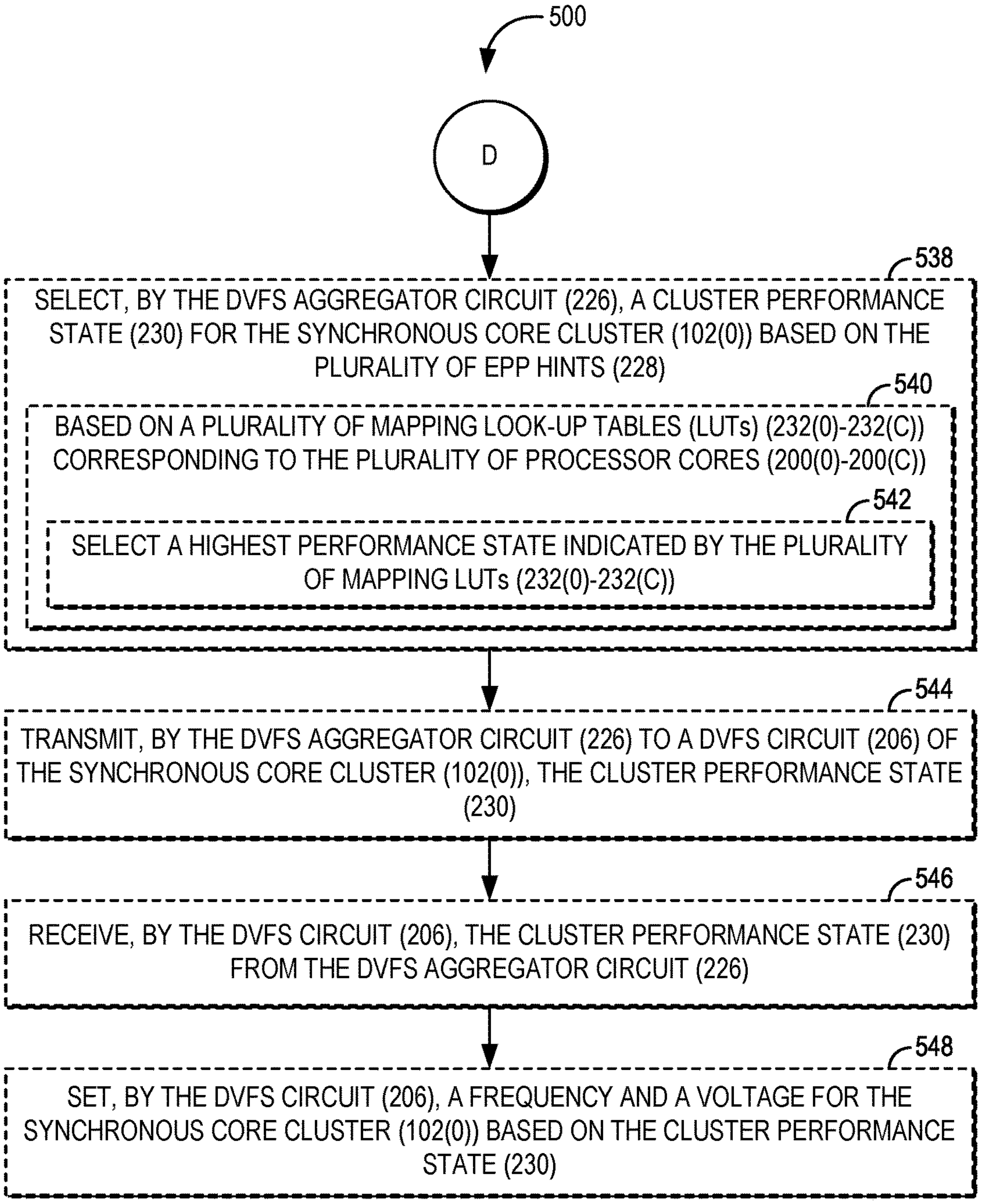

Turning now to FIG. 5D, the DVFS aggregator circuit 226 selects a cluster performance state (e.g., the cluster performance state 230 of FIG. 2) for the synchronous core cluster 102(0) based on the plurality of EPP hints 228 (block 538). According to some aspects, the operations of block 538 for selecting the cluster performance state 230 may comprise selecting the cluster performance state 230 based on a plurality of mapping LUTs (such as the mapping LUTs 232(0)-232(C) of FIG. 2) corresponding to the plurality of processor cores 200(0)-200(C) (block 540). In some aspects, the operations of block 540 for selecting the cluster performance state 230 based on the mapping LUTs 232(0)-232(C) may comprise selecting a highest performance state indicated by the plurality of mapping LUTs 232(0)-232(C) (block 542).

The DVFS aggregator circuit 226 transmits the cluster performance state 230 to a DVFS circuit (e.g., the DVFS circuit 206 of FIG. 2) of the synchronous core cluster 102(0) (block 544). The DVFS circuit 206 receives the cluster performance state 230 from the DVFS aggregator circuit 226 (block 546). The DVFS circuit 206 then sets a frequency and a voltage for the synchronous core cluster 102(0) based on the cluster performance state 230 (block 548).

The processor device according to aspects disclosed herein and discussed with reference to FIG. 1 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
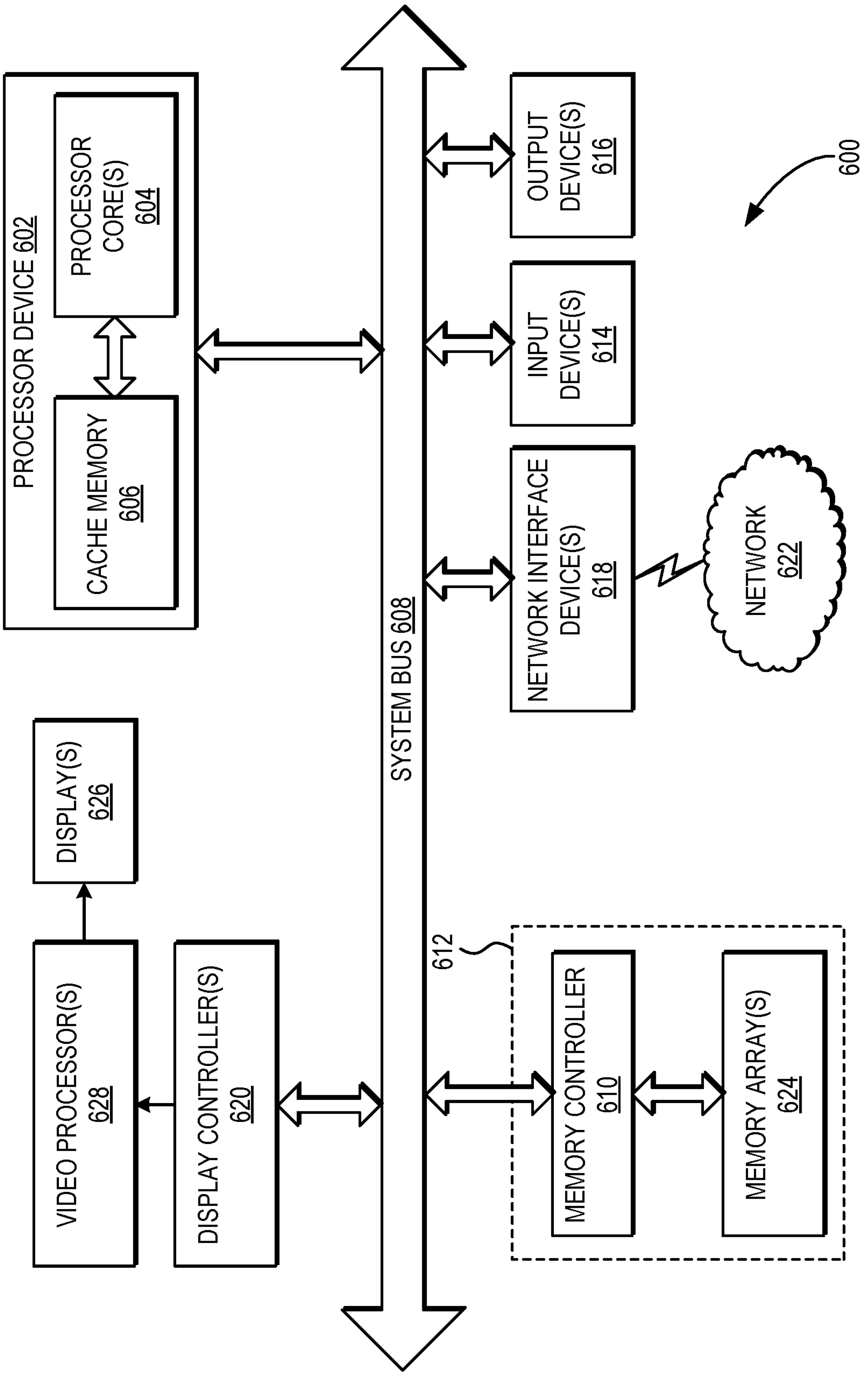
FIG. 6 is a block diagram of an exemplary processor-based device that can include the processor device of FIG. 1.

In this regard, FIG. 6 illustrates an example of a processor-based device 600 as illustrated and described with respect to FIG. 1. In this example, the processor-based device 600 includes a processor device 602, which corresponds in functionality to the processor device 100 of FIG. 1 and comprises one or more processor cores 604 coupled to a cache memory 606. The processor core(s) 604 is also coupled to a system bus 608 and can intercouple devices included in the processor-based device 600. As is well known, the processor core(s) 604 communicates with these other devices by exchanging address, control, and data information over the system bus 608. For example, the processor core(s) 604 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624. The display controller(s) may comprise, e.g., the GPU 104 of FIG. 1.

The processor core(s) 604 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
   a synchronous core cluster comprising:
      a plurality of processor cores;
      a throttling selection circuit; and
      a throttling circuit;
   the throttling selection circuit configured to:
      determine a performance state of a processor core of the plurality of processor cores;
      receive, from the processor core, a Quality-of-Service (QOS) level associated with a workload scheduled for execution by the processor core;
      determine a throttling level for the processor core based on the QoS level and the performance state; and
      provide the throttling level to the throttling circuit; and
   the throttling circuit configured to:
      receive the throttling level; and
      perform microarchitectural throttling of the processor core based on the throttling level.
2. The processor device of clause 1, wherein the throttling selection circuit is configured to determine the throttling level and provide the throttling level to the throttling circuit at periodic intervals.
3. The processor device of any one of clauses 1-2, wherein:
   the throttling selection circuit is further configured to determine an energy performance preference (EPP) level corresponding to the QoS level; and
   the throttling selection circuit is configured to determine the throttling level for the processor core based on the QoS level and the performance state by being configured to determine the throttling level for the processor core based on the EPP level and the performance state.
4. The processor device of clause 3, wherein:
   the throttling selection circuit comprises a mapping register that maps the QoS level to the EPP level; and
   the throttling selection circuit is configured to determine the EPP level based on the mapping register.
5. The processor device of any one of clauses 3-4, wherein the throttling selection circuit is configured to determine the EPP level by being configured to map the QoS level to the EPP level based on the performance state of the processor core.
6. The processor device of any one of clauses 3-5, wherein:
   the synchronous core cluster further comprises a plurality of throttling level look-up tables (LUTs) corresponding to the plurality of processor cores, each throttling level LUT comprising a plurality of entries organized as a plurality of rows corresponding to a plurality of EPP levels and a plurality of columns corresponding to a plurality of throttling levels, wherein each entry indicates a lowest performance state requiring a corresponding throttling level of the plurality of throttling levels to achieve an average core frequency of a corresponding EPP level of the plurality of EPP levels; and
   the throttling selection circuit is configured to determine the throttling level for the processor core by being configured to:
      select, in a throttling level LUT corresponding to the processor core of the plurality of throttling level LUTs, a row corresponding to the EPP level of the plurality of rows of the throttling level LUT; and
      determine the throttling level based on a column of a lowest performance state in the row that is greater than or equal to the performance state of the processor core.
7. The processor device of clause 6, wherein the throttling selection circuit is further configured to populate each throttling level LUT of the plurality of throttling level LUTs by being configured to:
   for each EPP level of the plurality of EPP levels:
      calculate an average core frequency corresponding to the EPP level; and
      for each throttling level of the plurality of throttling levels, calculate a corresponding performance state for the processor core that requires the throttling level to achieve at least the average core frequency.
8. The processor device of any one of clauses 1-7, wherein the throttling circuit is configured to perform the microarchitectural throttling of the processor core by being configured to insert no-operation (NOP) instructions for execution by the processor core.
9. The processor device of any one of clauses 1-8, wherein the synchronous core cluster further comprises:
   a dynamic voltage and frequency scaling (DVFS) aggregator circuit; and
   a DVFS circuit;
   the DVFS aggregator circuit configured to:
      receive, from the plurality of processor cores, a corresponding plurality of EPP hints;
      select a cluster performance state for the synchronous core cluster based on the plurality of EPP hints; and
      transmit, to the DVFS circuit, the cluster performance state; and
   the DVFS circuit configured to:
      receive the cluster performance state from the DVFS aggregator circuit; and
      set a frequency and a voltage for the synchronous core cluster based on the cluster performance state.
10. The processor device of clause 9, wherein:
   the synchronous core cluster further comprises a plurality of mapping look-up tables (LUTs) corresponding to the plurality of processor cores;
   each mapping LUT of the plurality of mapping LUTs maps an EPP hint of the plurality of EPP hints to a corresponding performance state; and
   the DVFS aggregator circuit selects the cluster performance state based on the plurality of mapping LUTs.
11. The processor device of clause 10, wherein the DVFS aggregator circuit is configured to select the cluster performance state based on the plurality of mapping LUTs by being configured to select a highest performance state indicated by the plurality of mapping LUTs.

12. The processor device of any one of clauses 1-11, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A processor device, comprising:
- means for determining a performance state of a processor core of a plurality of processor cores of a synchronous core cluster of the processor device;
- means for receiving, from the processor core, a Quality-of-Service (QOS) level associated with a workload scheduled for execution by the processor core;
- means for determining a throttling level for the processor core, based on the QoS level and the performance state; and
- means for performing microarchitectural throttling of the processor core based on the throttling level.

14. A method for performing dynamic microarchitectural throttling in processor cores based on Quality-of-Service (QOS) levels, comprising:
- determining, by a throttling selection circuit of a synchronous core cluster of a processor device, a performance state of a processor core of a plurality of processor cores of the synchronous core cluster;
- receiving, by the throttling selection circuit, a QoS level associated with a workload scheduled for execution by the processor core;
- determining, by the throttling selection circuit, a throttling level for the processor core, based on the QoS level and the performance state;
- providing, by the throttling selection circuit, the throttling level to a throttling circuit of the synchronous core cluster;
- receiving, by the throttling circuit, the throttling level; and
- performing, by the throttling circuit, microarchitectural throttling of the processor core based on the throttling level.

15. The method of clause 14, further comprising determining the throttling level and providing the throttling level to the throttling circuit at periodic intervals.

16. The method of any one of clauses 14-15, further comprising determining an energy performance preference (EPP) level corresponding to the QoS level;
- wherein determining the throttling level for the processor core based on the QoS level and the performance state comprises determining the throttling level for the processor core based on the EPP level and the performance state.

17. The method of clause 16, wherein:
- the throttling selection circuit comprises a mapping register that maps the QoS level to the EPP level; and
- determining the EPP level is based on the mapping register.

18. The method of any one of clauses 16-17, wherein determining the EPP level comprises mapping the QoS level to the EPP level based on the performance state of the processor core.

19. The method of any one of clauses 16-18, wherein:
- the synchronous core cluster comprises a plurality of throttling level look-up tables (LUTs) corresponding to the plurality of processor cores, each throttling level LUT comprising a plurality of entries organized as a plurality of rows corresponding to a plurality of EPP levels and a plurality of columns corresponding to a plurality of throttling levels, wherein each entry indicates a lowest performance state requiring a corresponding throttling level of the plurality of throttling levels to achieve an average core frequency of a corresponding EPP level of the plurality of EPP levels; and
- determining the throttling level for the processor core comprises:
  - selecting, in a throttling level LUT corresponding to the processor core of the plurality of throttling level LUTs, a row corresponding to the EPP level of the plurality of rows of the throttling level LUT; and
  - determining the throttling level based on a column of a lowest performance state in the row that is greater than or equal to the performance state of the processor core.

20. The method of clause 19, further comprising populating each throttling level LUT of the plurality of throttling level LUTs by:
- for each EPP level of the plurality of EPP levels:
  - calculating an average core frequency corresponding to the EPP level; and
  - for each throttling level of the plurality of throttling levels, calculating a corresponding performance state for the processor core that requires the throttling level to achieve at least the average core frequency.

21. The method of any one of clauses 14-20, wherein performing microarchitectural throttling of the processor core comprises inserting no-operation (NOP) instructions for execution by the processor core.

22. The method of any one of clauses 14-21, further comprising:
- receiving, by a dynamic voltage and frequency scaling (DVFS) aggregator circuit of the synchronous core cluster from the plurality of processor cores, a corresponding plurality of EPP hints;
- selecting, by the DVFS aggregator circuit, a cluster performance state for the synchronous core cluster based on the plurality of EPP hints;
- transmitting, by the DVFS aggregator circuit to a DVFS circuit of the synchronous core cluster, the cluster performance state;
- receiving, by the DVFS circuit, the cluster performance state from the DVFS aggregator circuit; and
- setting, by the DVFS circuit, a frequency and a voltage for the synchronous core cluster based on the cluster performance state.

23. The method of clause 22, wherein:
- the synchronous core cluster comprises a plurality of mapping look-up tables (LUTs) corresponding to the plurality of processor cores;

each mapping LUT of the plurality of mapping LUTs maps an EPP hint of the plurality of EPP hints to a corresponding performance state; and selecting the cluster performance state is based on the plurality of mapping LUTs.

24. The method of clause 23, wherein selecting the cluster performance state based on the plurality of mapping LUTs comprises selecting a highest performance state indicated by the plurality of mapping LUTs.

25. A non-transitory computer-readable medium, having stored thereon computer-executable instructions that, when executed, cause a processor device of a processor-based device to:

determine a performance state of a processor core of a plurality of processor cores of a synchronous core cluster of the processor device;

receive a Quality-of-Service (QOS) level associated with a workload scheduled for execution by the processor core;

determine a throttling level for the processor core, based on the QoS level and the performance state; and perform microarchitectural throttling of the processor core based on the throttling level.

26. The non-transitory computer-readable medium of clause 25, wherein the computer-executable instructions cause the processor device to determine the throttling level, and provide the throttling level to the throttling circuit at periodic intervals.

27. The non-transitory computer-readable medium of any one of clauses 25-26, wherein:

the computer-executable instructions further cause the processor device to determine an energy performance preference (EPP) level corresponding to the QoS level; and the computer-executable instructions cause the processor device to determine the throttling level for the processor core based on the QoS level and the performance state by causing the processor device to determine the throttling level for the processor core based on the EPP level and the performance state.

28. The non-transitory computer-readable medium of clause 27, wherein the computer-executable instructions cause the processor device to determine the EPP level based on a mapping register that maps the QoS level to the EPP level.

29. The non-transitory computer-readable medium of any one of clauses 27-28, wherein the computer-executable instructions cause the processor device to determine the EPP level by causing the processor device to map the QoS level to the EPP level based on the performance state of the processor core.

30. The non-transitory computer-readable medium of any one of clauses 27-29, wherein:

the synchronous core cluster comprises a plurality of throttling level look-up tables (LUTs) corresponding to the plurality of processor cores, each throttling level LUT comprising a plurality of entries organized as a plurality of rows corresponding to a plurality of EPP levels and a plurality of columns corresponding to a plurality of throttling levels, wherein each entry indicates a lowest performance state requiring a corresponding throttling level of the plurality of throttling levels to achieve an average core frequency of a corresponding EPP level of the plurality of EPP levels; and the computer-executable instructions cause the processor device to determine the throttling level for the processor core by causing the processor device to:

select, in a throttling level LUT corresponding to the processor core of the plurality of throttling level LUTs, a row corresponding to the EPP level of the plurality of rows of the throttling level LUT; and determine the throttling level based on a column of a lowest performance state in the row that is greater than or equal to the performance state of the processor core.

31. The non-transitory computer-readable medium of clause 30, wherein the computer-executable instructions further cause the processor device to populate each throttling level LUT of the plurality of throttling level LUTs by causing the processor device to:

for each EPP level of the plurality of EPP levels:

calculate an average core frequency corresponding to the EPP level; and for each throttling level of the plurality of throttling levels, calculate a corresponding performance state for the processor core that requires the throttling level to achieve at least the average core frequency.

32. The non-transitory computer-readable medium of any one of clauses 25-31, wherein the computer-executable instructions cause the processor device to perform microarchitectural throttling of the processor core by causing the processor device to insert no-operation (NOP) instructions for execution by the processor core.

33. The non-transitory computer-readable medium of any one of clauses 25-32, wherein the computer-executable instructions further cause the processor device to:

receive, from the plurality of processor cores, a corresponding plurality of EPP hints;

select a cluster performance state for the synchronous core cluster based on the plurality of EPP hints; and set a frequency and a voltage for the synchronous core cluster based on the cluster performance state.

34. The non-transitory computer-readable medium of clause 33, wherein:

the synchronous core cluster comprises a plurality of mapping look-up tables (LUTs) corresponding to the plurality of processor cores;

each mapping LUT of the plurality of mapping LUTs maps an EPP hint of the plurality of EPP hints to a corresponding performance state; and the computer-executable instructions cause the processor device to select the cluster performance state based on the plurality of mapping LUTs.

35. The non-transitory computer-readable medium of clause 34, wherein the computer-executable instructions cause the processor device to select the cluster performance state based on the plurality of mapping LUTs by causing the processor device to select a highest performance state indicated by the plurality of mapping LUTs.

What is claimed is:

1. A processor device, comprising:

a synchronous core cluster comprising:

a plurality of processor cores;

a plurality of throttling level look-up tables (LUTs) corresponding to the plurality of processor cores, each throttling level LUT comprising a plurality of entries organized as a plurality of rows corresponding to a plurality of energy performance preference (EPP) levels and a plurality of columns corresponding to a plurality of throttling levels, wherein each entry indicates a lowest performance state requiring a corresponding throttling level of the plurality of throttling levels to achieve an average core frequency of a corresponding EPP level of the plurality of EPP levels;
a throttling selection circuit; and
a throttling circuit;
the throttling selection circuit configured to:
determine a performance state of a processor core of the plurality of processor cores;
receive, from the processor core, a Quality-of-Service (QOS) level associated with a workload scheduled for execution by the processor core;
determine a throttling level for the processor core based on the QoS level and the performance state;
determine an EPP level corresponding to the QoS level;
select, in a throttling level LUT corresponding to the processor core of the plurality of throttling level LUTs, a row corresponding to the EPP level of the plurality of rows of the throttling level LUT; and
determine a throttling level for the processor core based on a column of a lowest performance state in the row that is greater than or equal to the performance state of the processor core; and
provide the throttling level to the throttling circuit; and
the throttling circuit configured to:
receive the throttling level; and
perform microarchitectural throttling of the processor core based on the throttling level, without changing a clock frequency of the synchronous core cluster and without changing a voltage of the synchronous core cluster.

2. The processor device of claim 1, wherein the throttling selection circuit is configured to determine the throttling level and provide the throttling level to the throttling circuit at periodic intervals.

3. The processor device of claim 1, wherein:
the throttling selection circuit comprises a mapping register that maps the QoS level to the EPP level; and
the throttling selection circuit is configured to determine the EPP level based on the mapping register.

4. The processor device of claim 1, wherein the throttling selection circuit is configured to determine the EPP level by being configured to map the QoS level to the EPP level based on the performance state of the processor core.

5. The processor device of claim 1, wherein the throttling selection circuit is further configured to populate each throttling level LUT of the plurality of throttling level LUTs by being configured to:
for each EPP level of the plurality of EPP levels:
calculate an average core frequency corresponding to the EPP level; and
for each throttling level of the plurality of throttling levels, calculate a corresponding performance state for the processor core that requires the throttling level to achieve at least the average core frequency.

6. The processor device of claim 1, wherein the throttling circuit is configured to perform the microarchitectural throttling of the processor core by being configured to insert no-operation (NOP) instructions for execution by the processor core.

7. The processor device of claim 1, wherein the synchronous core cluster further comprises:
a dynamic voltage and frequency scaling (DVFS) aggregator circuit; and
a DVFS circuit;
the DVFS aggregator circuit configured to:
receive, from the plurality of processor cores, a corresponding plurality of EPP hints;
select a cluster performance state for the synchronous core cluster based on the plurality of EPP hints; and
transmit, to the DVFS circuit, the cluster performance state; and
the DVFS circuit configured to:
receive the cluster performance state from the DVFS aggregator circuit; and
set a frequency and a voltage for the synchronous core cluster based on the cluster performance state.

8. The processor device of claim 7, wherein:
the synchronous core cluster further comprises a plurality of mapping look-up tables (LUTs) corresponding to the plurality of processor cores;
each mapping LUT of the plurality of mapping LUTs maps an EPP hint of the plurality of EPP hints to a corresponding performance state; and
the DVFS aggregator circuit selects the cluster performance state based on the plurality of mapping LUTs.

9. The processor device of claim 8, wherein the DVFS aggregator circuit is configured to select the cluster performance state based on the plurality of mapping LUTs by being configured to select a highest performance state indicated by the plurality of mapping LUTs.

10. The processor device of claim 1, integrated into a device selected from the group consisting of: a set top box; an entertainment unit; a navigation device; a communications device; a fixed location data unit; a mobile location data unit;
a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A processor device, comprising:
means for determining a performance state of a processor core of a plurality of processor cores of a synchronous core cluster of the processor device, wherein:
the synchronous core cluster comprises a plurality of throttling level look-up tables (LUTs) corresponding to the plurality of processor cores, each throttling level LUT comprising a plurality of entries organized as a plurality of rows corresponding to a plurality of energy performance preference (EPP) levels and a plurality of columns corresponding to a plurality of throttling levels; and
each entry indicates a lowest performance state requiring a corresponding throttling level of the plurality of throttling levels to achieve an average core frequency of a corresponding EPP level of the plurality of EPP levels;
means for receiving, from the processor core, a Quality-of-Service (QOS) level associated with a workload scheduled for execution by the processor core;
means for determining a throttling level for the processor core, based on the QoS level and the performance state;
means for determining an EPP level corresponding to the QoS level;

means for selecting, in a throttling level LUT corresponding to the processor core of the plurality of throttling level LUTs, a row corresponding to the EPP level of the plurality of rows of the throttling level LUT;

means for determining a throttling level for the processor core based on a column of a lowest performance state in the row that is greater than or equal to the performance state of the processor core; and means for performing microarchitectural throttling of the processor core based on the throttling level, without changing a clock frequency of the synchronous core cluster and without changing a voltage of the synchronous core cluster.

12. A method for performing dynamic microarchitectural throttling in processor cores based on Quality-of-Service (QOS) levels, comprising:

determining, by a throttling selection circuit of a synchronous core cluster of a processor device, a performance state of a processor core of a plurality of processor cores of the synchronous core cluster, wherein:

the synchronous core cluster comprises a plurality of throttling level look-up tables (LUTs) corresponding to the plurality of processor cores, each throttling level LUT comprising a plurality of entries organized as a plurality of rows corresponding to a plurality of energy performance preference (EPP) levels and a plurality of columns corresponding to a plurality of throttling levels; and each entry indicates a lowest performance state requiring a corresponding throttling level of the plurality of throttling levels to achieve an average core frequency of a corresponding EPP level of the plurality of EPP levels;

receiving, by the throttling selection circuit, a QoS level associated with a workload scheduled for execution by the processor core;

determining, by the throttling selection circuit, a throttling level for the processor core, based on the QoS level and the performance state;

determining, by the throttling selection circuit, an EPP level corresponding to the QoS level;

selecting, by the throttling selection circuit, in a throttling level LUT corresponding to the processor core of the plurality of throttling level LUTs, a row corresponding to the EPP level of the plurality of rows of the throttling level LUT;

determining, by the throttling selection circuit, a throttling level for the processor core based on a column of a lowest performance state in the row that is greater than or equal to the performance state of the processor core;

providing, by the throttling selection circuit, the throttling level to a throttling circuit of the synchronous core cluster;

receiving, by the throttling circuit, the throttling level; and performing, by the throttling circuit, microarchitectural throttling of the processor core based on the throttling level, without changing a clock frequency of the synchronous core cluster and without changing a voltage of the synchronous core cluster.

13. The method of claim 12, further comprising determining the throttling level and providing the throttling level to the throttling circuit at periodic intervals.

14. The method of claim 12, wherein:

the throttling selection circuit comprises a mapping register that maps the QoS level to the EPP level; and determining the EPP level is based on the mapping register.

15. The method of claim 12, wherein determining the EPP level comprises mapping the QoS level to the EPP level based on the performance state of the processor core.

16. The method of claim 12, further comprising populating each throttling level LUT of the plurality of throttling level LUTs by:

for each EPP level of the plurality of EPP levels:

calculating an average core frequency corresponding to the EPP level; and for each throttling level of the plurality of throttling levels, calculating a corresponding performance state for the processor core that requires the throttling level to achieve at least the average core frequency.

17. The method of claim 12, wherein performing microarchitectural throttling of the processor core comprises inserting no-operation (NOP) instructions for execution by the processor core.

18. The method of claim 12, further comprising:

receiving, by a dynamic voltage and frequency scaling (DVFS) aggregator circuit of the synchronous core cluster from the plurality of processor cores, a corresponding plurality of EPP hints;

selecting, by the DVFS aggregator circuit, a cluster performance state for the synchronous core cluster based on the plurality of EPP hints;

transmitting, by the DVFS aggregator circuit to a DVFS circuit of the synchronous core cluster, the cluster performance state;

receiving, by the DVFS circuit, the cluster performance state from the DVFS aggregator circuit; and setting, by the DVFS circuit, a frequency and a voltage for the synchronous core cluster based on the cluster performance state.

19. The method of claim 18, wherein:

the synchronous core cluster comprises a plurality of mapping look-up tables (LUTs) corresponding to the plurality of processor cores;

each mapping LUT of the plurality of mapping LUTs maps an EPP hint of the plurality of EPP hints to a corresponding performance state; and selecting the cluster performance state is based on the plurality of mapping LUTs.

20. The method of claim 19, wherein selecting the cluster performance state based on the plurality of mapping LUTs comprises selecting a highest performance state indicated by the plurality of mapping LUTs.

21. A non-transitory computer-readable medium, having stored thereon computer-executable instructions that, when executed, cause a processor device of a processor-based device to:

determine a performance state of a processor core of a plurality of processor cores of a synchronous core cluster of the processor device, wherein:

the synchronous core cluster comprises a plurality of throttling level look-up tables (LUTs) corresponding to the plurality of processor cores, each throttling level LUT comprising a plurality of entries organized as a plurality of rows corresponding to a plurality of energy performance preference (EPP) levels and a plurality of columns corresponding to a plurality of throttling levels; and each entry indicates a lowest performance state requiring a corresponding throttling level of the plurality of throttling levels to achieve an average core frequency of a corresponding EPP level of the plurality of EPP levels;

receive a Quality-of-Service (QOS) level associated with a workload scheduled for execution by the processor core;

determine a throttling level for the processor core, based on the QoS level and the performance state;

determine an EPP level corresponding to the QoS level;

select, in a throttling level LUT corresponding to the processor core of the plurality of throttling level LUTs, a row corresponding to the EPP level of the plurality of rows of the throttling level LUT;

determine a throttling level for the processor core based on a column of a lowest performance state in the row that is greater than or equal to the performance state of the processor core; and perform microarchitectural throttling of the processor core based on the throttling level, without changing a clock frequency of the synchronous core cluster and without changing a voltage of the synchronous core cluster.

22. The non-transitory computer-readable medium of claim 21, wherein the computer-executable instructions cause the processor device to determine the throttling level, and provide the throttling level to the throttling circuit at periodic intervals.

23. The non-transitory computer-readable medium of claim 21, wherein the computer-executable instructions cause the processor device to determine the EPP level based on a mapping register that maps the QoS level to the EPP level.

24. The non-transitory computer-readable medium of claim 21, wherein the computer-executable instructions cause the processor device to determine the EPP level by causing the processor device to map the QoS level to the EPP level based on the performance state of the processor core.

25. The non-transitory computer-readable medium of claim 21, wherein the computer-executable instructions further cause the processor device to populate each throttling level LUT of the plurality of throttling level LUTs by causing the processor device to:

for each EPP level of the plurality of EPP levels:

calculate an average core frequency corresponding to the EPP level; and for each throttling level of the plurality of throttling levels, calculate a corresponding performance state for the processor core that requires the throttling level to achieve at least the average core frequency.

26. The non-transitory computer-readable medium of claim 21, wherein the computer-executable instructions cause the processor device to perform microarchitectural throttling of the processor core by causing the processor device to insert no-operation (NOP) instructions for execution by the processor core.

27. The non-transitory computer-readable medium of claim 21, wherein the computer-executable instructions further cause the processor device to:

receive, from the plurality of processor cores, a corresponding plurality of EPP hints;

select a cluster performance state for the synchronous core cluster based on the plurality of EPP hints; and set a frequency and a voltage for the synchronous core cluster based on the cluster performance state.

28. The non-transitory computer-readable medium of claim 27, wherein:

the synchronous core cluster comprises a plurality of mapping look-up tables (LUTs) corresponding to the plurality of processor cores;

each mapping LUT of the plurality of mapping LUTs maps an EPP hint of the plurality of EPP hints to a corresponding performance state; and the computer-executable instructions cause the processor device to select the cluster performance state based on the plurality of mapping LUTs.

29. The non-transitory computer-readable medium of claim 28, wherein the computer-executable instructions cause the processor device to select the cluster performance state based on the plurality of mapping LUTs by causing the processor device to select a highest performance state indicated by the plurality of mapping LUTs.

* * * * *